Patented Aug. 1, 1950

2,516,863

UNITED STATES PATENT OFFICE 2,516,863

PROCESS OF PRODUCING TANTALUM, COLUMBIUM, AND COMPOUNDS THEREOF

Daniel Gardner, New York, N. Y.

No Drawing. Application July 15, 1946,
Serial No. 683,765

10 Claims. (Cl. 75—84)

This invention is a novel metallurgical process, which may be and preferably is continuous in practical operation, for refining and reducing tantalum and columbium from their concentrates. Besides being available either for batch operations or the preferable continuous production, there are several aspects to the invention and process in that certain of the disclosed steps or other features may be usefully available for the refining or production of tantalum from starting materials or concentrates free of columbium, or secondly, for the production of columbium from materials free of tantalum; while thirdly, the invention presents its greatest utility in the industrial production of both tantalum and columbium from concentrates or other combinations which contain both of these metallic elements, as is very frequently the case with minerals containing at least one thereof.

In any of such cases the process hereof may commence with concentrated mixtures needing pre-refining or preliminary purification, in which case the invention includes such purification steps, yielding substantially pure products consisting of compounds of tantalum and/or columbium. As far as known to this applicant the industrial production, including refining, reduction and/or separation of the metals tantalum and columbium has not been fully developed; and a number of previous attempts have been such as to be available only for the batch system of procedure, and no attempted methods have been well adapted to the continuous system available for industrial production. The objects and advantages of the present invention will be pointed out in the hereinafter following description of selected embodiments of the invention or will be understood by those conversant with the subject. The invention consists in the process of refining and reducing tantalum and/or columbium from their concentrates, or from combinations containing one or both of said metals, and consists further in the various stages or steps of procedure, reactions and agents employed therefor, and other features as will be pointed out in the claims appended to the description.

Specifically the invention consists in the described method and steps for the stages of the refining and reducing of tantalum and/or columbium, and more especially of a starting combination or concentrate containing both thereof. In the last mentioned aspect the invention may be described as the process of treating combinations or concentrates which contain oxides of both tantalum and columbium, treated in powdery form, for the recovery of both of such metals (preferably separately) and comprising the refining stage and the following steps performed thereafter, namely (1) reducing the tantalum and columbium compounds in a substantially inert atmosphere by reaction with a saline hydride (such as calcium hydride and others to be mentioned) in the presence of a powdery light metal (such as aluminium, magnesium, calcium, lithium, etc. combinable exothermically with oxygen) thereby yielding a mixture of tantalum and columbium in powdery metal form, and (2) then separating the two metals from each other unless it be desired in any particular case to retain the metals in mixture for the purpose of modifying the proportions thereof in preparation for other practical uses, such as the formation of tantalum-columbium compounds or alloy ingredients. The term powdery is intended to include from flaky or shaving size down to very fine subdivision or pulverization.

When the full embodiment of the invention or process carries to the point of separating the two metals from each other this may be done in various ways or submethods, such as one or another of the following operations: (a) disperse the mixture in a vehicle or bath of molten sodium tetraborate, maintained at about 800° (all references to temperature herein are by the centigrade system) and there allowing the tantalum to precipitate, which it does relatively rapidly, while the columbium remains in dispersion or partial solution in the molten vehicle; (b) subject a mixture of the two powdery metals to centrifugal force, in a high speed centrifuge, causing the heavier tantalum to accumulate at the periphery, the columbium, of lighter specific gravity, nearer the center, for progressive separate removal, with an intermediate zone between them wherein separation gradually proceeds; or (c) subject the mixture of metals to melting and distillation, in order thus to separate away from the mixture the columbium well above its boiling point of 3700° but well below the boiling point of 4100° but above the melting point 2850° of tantalum, the latter remaining in molten form while the former is condensed at a remote point or receptacle, from which it may be flowed to solidify as ingots or in molds.

Among important factors regarding Ta and Cb are that they have various properties in common, tending to impede their separate recovery, and that they are usually found together in the same numerous minerals or ores, notably in tantalite and columbite. Minerals containing tantalates and columbates must be analyzed for the presence of other compounds, constituting impurities, such as silicates, titanates and fluorides of Li, Na, K, Ca, Sn, Pb, Bi, U, Mn, Fe and other metals. Such impurities are preferably removed by refining the concentrate but could in some cases be left until after reduction.

It is a common rule in metallurgy to reduce metal oxides in the purest state at the lowest possible temperature and also at the cheapest price, if the metals thereby obtained are to enjoy general application.

It is with this object in view that applicant discards the methods today in use and relies specifically on the use of the hydrides and silicides.

Of the four kinds of hydrides known, only two are of importance in the present case, namely, the saline hydrides and the hydrogen compounds of the alloy type, the former having preference.

The saline compounds including those of the so-called light metals are useful as reagents. All of them can be considered as derivatives of a hypothetic acid, HH, called hydrohydric acid, in which one atom of hydrogen is replaced by the light metal, whereas the second atom acts as a metalloid. Experience has shown that in this case hydrides on splitting up discharge atomic hydrogen, which, as known, is far more reactive than molecular hydrogen, but has a very short life, since due to its low atomic weight it rapidly diffuses, being adsorbed by the walls of the apparatus, and it combines to form molecular hydrogen. However, during its very short period of existence, atomic hydrogen can be used as an outstanding reducing agent. It is this very quality which is made use of in the present invention, wherein for practical reasons calcium hydride, $CaH_2$, is preferred to the hydrides of lithium, sodium and barium, or others that are operative but inferior.

From a practical point of view it is preferable to work the present process with exothermic reactions.

At the start the new process was worked as a batch process, using crucibles as in the well established Goldschmidt method.

The direct action of the light metals on tantalum pentoxide, more particularly aluminium, has been known since von Bolton proposed this reduction, by taking this metal in excess and thereupon removing this excess in vacuo by the electric arc:

$$3Ta_2O_5 + 10Al = 5Al_2O_3 + 6Ta + 500.6 \text{ Cal.}$$

The reaction was carried out in a refractory crucible suitable to stand the heat, which mounts rapidly, the Al giving highly exothermic action. Thereby tantalum pentoxide (M. P. 1470°) is decomposed, fine metal being formed, (M. P. 2850°) and alumina (M. P. 2050°), which starts volatilizing at 2250°. A similar reaction, but with less evolution of heat takes place if powdered magnesium is applied:

$$Ta_2O_5 + 5Mg = 2Ta + 5MgO + 230.7 \text{ Cal.}$$

Now it has been ascertained by applicant that calcium hydride (which decomposes at 675°) in powder form well mixed with tantalum pentoxide, also reduces the oxide, whereby owing to a comparatively lower temperature prevailing, tantalum hydride is formed and the metal is saturated with hydrogen (at 675° tantalum will be charged with 19.8 mg. hydrogen).

The reaction starts at 675°, when calcium hydride begins to decompose, yielding:

$$Ta_2O_5 + 3CaH_2 = 2TaH + 3CaO + 2H_2O + 137.5 \text{ Cal.}$$

This reaction is adapted to be brought well under control if the process, instead of being run in batch, is to be run in a continuous manner in a suitable electric furnace. Subjecting the TaH to yet higher temperatures, as 1850°±, reduces the metal.

Obviously, calcium hydride, well mixed with aluminium and tantalum pentoxide powdered, can also be used, mounting in temperature, so that the reaction takes place beyond the temperature of 1850°, when hydrogen no longer forms tantalum hydride and no free hydrogen is retained by the metal:

$$Ta_2O_5 + 2Al + CaH_2 = 2Ta + Al_2O_3 + CaO + H_2O + 75.0 \text{ Cal.}$$

It is noteworthy that only one fifth of the light metal is used in this case for the reduction, as compared with the Bolton reaction.

A similar reaction but at a lower temperature in which magnesium is added to calcium hydride as reducing agent, is as follows:

$$Ta_2O_5 + 2CaH_2 + 2Mg = 2TaH + 2CaO + 2MgO + H_2O + 258.7 \text{ Cal.}$$

In this reaction magnesium can be replaced by calcium as reducing agent, also working at low temperature; thus:

$$Ta_2O_5 + 2CaH_2 + 2Ca = 2TaH + 4CaO + H_2O + 270.5 \text{ Cal.}$$

Another modification can be admitted, by introducing air into the reaction, thus increasing the temperature; thus:

$$Ta_2O_5 + 2CaH_2 + 2Al + O(air) = 2TaH + 2CaO + Al_2O_3 + H_2O + 352.4 \text{ Cal.}$$

A good result follows by increasing the amount of magnesium as reducing agent; thus:

$$Ta_2O_5 + CaH_2 + 4Mg = 2TaH + CaO + 4MgO + 372.3 \text{ Cal.}$$

When decreasing by one fourth the quantity of magnesium, and mounting in temperature, so as to pass beyond the tantalum hydride stage, the following occurs:

$$Ta_2O_5 + CaH_2 + 3Mg = 2Ta + CaO + 3MgO + H_2O + 113.3 \text{ Cal.}$$

It has been thus shown, how calcium hydride, alone or accompanied by powdered light metal, can reduce tantalum pentoxide.

It is found that the light metal hydride can be replaced with a suitable silicide; thereby tantalum is obtained as tantalum silicide. The use of the calcium hydride, or equivalent hydrides or silicides, is believed to constitute a novel step in the industrial refining of tantalum and/or columbium; but for practical purposes silicides are generally inferior to hydrides, while borides are more so and of low industrial value; and the calcium hydride is the most desirable and effective for practical economic reasons although certain mixtures possess advantages such as a combination of calcium hydride with calcium silicide.

Calcium silicide (M. P. 1020°) well mixed with powdered tantalum pentoxide, in a current of air, heated in a crucible under its melting point, reacts as follows:

$$Ta_2O_5 + 3CaSi_2 + O_2 = 2TaSi_2 + 3CaO + 2SiO_2 + 465.6 \text{ Cal.}$$

Magnesium silicide, of the formula $MgSi_2$ (M. P. 1200°) acts similarly:

$$Ta_2O_5 + 4MgSi_2 + 7O = 2TaSi_2 + 4MgO + 4SiO_2 + 1018 \text{ Cal.}$$

Tantalum silicide thereby obtained has a very high melting point; but on heating beyond 3300° it disintegrates, whereby silicon is distilled off, and a very pure tantalum remains behind.

The same reaction can be slightly modified, if conducted as follows:

$$Ta_2O_5 + 3MgSi_2 + O_2 = 2TaSi_2 + 3MgO + 2SiO_2 + 632.7 \text{ Cal.}$$

If, however, the ordinary magnesium silicide, $Mg_2Si$ with M. P. of 1102°, is taken, which has proved to be of great value for the obtention of the silicanes, the reaction goes differently as will be seen later below.

The combining of calcium silicide and calcium hydride in a current of air, has been very successful, thus:

$$Ta_2O_5 + 3CaH_2 + 2CaSi_2 + 3O = 2TaSi_2 + 5CaO + 3H_2O + 658.5 \text{ Cal.}$$

The same ingredients can be taken also as follows, the reaction becoming more exothermic:

$$Ta_2O_5 + 2CaH_2 + 3CaSi_2 + 3O_2 = 2TaSi_2 + 5CaO + 2SiO_2 + 814 \text{ Cal.}$$

An important improvement was arrived at when tantalum pentoxide was mixed with powdered aluminium silicide (M. P. 843°) in a current of air, namely:

$$Ta_2O_5 + 4AlSi_3 + 11O = 2TaSi_2 + Al_2O_3 \cdot 2SiO_2 + 3Al_2O_3 + 1704.5 \text{ Cal.}$$

A still greater calorific effect was achieved by adding to this reaction calcium hydride:

$$Ta_2O_5 + 2Al_4Si_3 + 2CaH_2 + 15O = 2TaSi_2 + Al_2Si_2O_9H_4 + 2Ca(AlO_2)_2 + Al_2O_3 + 2074 \text{ Cal.}$$

As the result of this reaction are obtained calcium aluminate (M. P. 1600°) and the hydrated silico-aluminate $Al_2O_3 \cdot 2SiO_2 \cdot 2H_2O$, which, on account of being hydrated, has a considerably lower melting point.

In general the reactions cited for the tantalum compounds pass in a similar manner for the corresponding columbium derivatives. The general difference is that the densities of the latter are lower, also the melting and boiling points, and the heats of formation.

The thermal balance in all above cited reactions is higher for the columbium compounds, with the exception of the silicides, wherewith the total heat balance is in favor of the tantalum compounds due to the fact that the heat of formation of tantalum silicide is 390 Calories, whereas with columbium silicide it is only 348 Calories.

To throw further light on the nature of Ta and Cb certain further general considerations should be kept in mind for a full understanding of the invention. It has already been pointed out, that of all minerals containing tantalum and columbium, tantalites and columbites attract foremost attention for industrial purposes.

In this respect the table prepared by H. V. Ellsworth gives a useful picture concerning the relation of density to the composition in tantalite-columbite, in which even the most important impurities (titanium, iron, manganese, tin, etc.) are well accounted for. The knowledge provided by said table greatly facilitates the work with the concentrates, when passing over to the refining of these concentrates.

The powdered concentrate well mixed with some pure carbon and heated to a temperature well under 300° then cooled, permits the removal by magnetic means of the iron and the titanium, which may constitute a preliminary refining step.

Any tin, if present, is in form of tin oxide (cassiterite) which is best removed by heating the powder with any of the light metals, as aluminium, whereby the reaction goes thus:

$$3SnO_2 + 2Al = 3Sn + Al_2O_3 + 383.9 \text{ Cal.}$$

The molten tin is easily removed from the main body of the concentrate.

Manganese is solubilized by adding any suitable oxidizing agent, and then leached away.

It must be borne in mind, that the pentoxides of columbium and tantalum, whilst these metals belong to the same group of the periodic system as vanadium, do not as a rule tend to form complex compounds with other acids; however, both above pentoxides form compounds with oxalic acid; therefore vanadic oxide stands nearer to molybdic and tungstic oxides of the neighboring sixth group. But on the other hand columbic pentoxide, like vanadic ($V_2O_5$), molybdic ($MoO_3$) and tungstic ($WO_3$) oxides, can be fully volatilized by energetic heating in concentrated hydrochloric acid (D, 1.19), a reaction which the corresponding tantalum pentoxide does not give. The latter oxide, contrary to the niobic oxide, does not become of a crystalline structure on energetic ignition; and it also can not be recrystallized from fused anhydrous borax. Thus the way is indicated to eliminate the Cb by a refining step before reduction of the Ta.

There is, however, one important point in common for columbic, tantalic and tungstic oxides—they are not, like vanadic pentoxide, strong oxidizing agents.

A point in common for the pentoxides of columbium and those of tantalum, is that they do not form acid salts, so that without the intervention of an alkali base not even any salt is obtainable. When heating to redness individually the two pentoxides, a white amorphous insoluble power is obtained, soluble only thereafter in hydrofluoric acid. The color of columbium pentoxide turns yellow; which does not take place, under similar treatment, with tantalum pentoxide.

Referring in further detail to the separation of Ta and Cb from each other, it has already been mentioned that concentrates as such, without the complete removal of all included impurities, can undergo a direct reduction by hydrides of light metals, their silicides, or borides, or mixtures of them.

But in view of the fact that, particularly in the cases when silicides (or borides) are used, troubles can develope if iron, titanium or manganese are present, as they give compounds like iron silicide, manganese silicide etc.; therefore it is highly recommended to refine out and remove all impurities, leaving for further treatment and reduction only the pentoxides of columbium and tantalum, or mixtures of the two.

In the case of mixtures of Ta and Cb pentoxides the three following alternative separating treatments are available.

(1) Once the impurities are removed, it is feasible to take the powdered mixture of the two pentoxides and introduce it gradually, in small portions, into a bath of molten anhydrous borax (M. P. 741°), e. g. at about 800°, after having removed from this borax all possible impurities by pre-treatment with alcohol, which does not dissolve borax. This anhydrous pure borax is stable up to a temperature of far beyond 1200°. But such a temperature is not needed at all; in fact, a temperature higher than fifty to sixty degrees above the melting point of pure anhydrous borax would develop a tendency to dissolve also the tantalum pentoxide; which latter is to be separated by this operation as good as quantitatively, whereupon the separated tantalum pentoxide is reduced by itself. The columbium pentoxide, dispersed or dissolved in the pure molten borax, (while the Ta compound precipitates) shows a tendency to deposit on later cooling. Any part of it, retained in the borax, can easily be separated by adding water (The tetraborate of sodium at 40° dissolves 8.79 parts in 100 cc. distilled water).

(2) The pentoxides of tantalum and columbium in the various minerals, being acidic compounds, are combined with other oxides, such as those of iron, manganese, titanium, yttrium, cerium, calcium, uranium, antimony, lead, erbium, thorium, zirconium etc. They are, in other words, not combined with each other. Therefore, if the reduction at a reasonably low temperature, by any of the individual or mixed reducing agents, is carried out with care, that is to say considerably lower than at the melting point of columbic oxide (M. P. 1520°), which is practically always the case, the metals or their derivatives (silicides, borides etc.) are obtained individually. As there exists a very considerable difference in the melting points of these two metals (Ta 2850° and Cb 1950°) but, more importantly, as their specific gravities are also so different, (Ta 16.6; Cb 8.55) tantalum having about twice the density of columbium, it has been found possible to separate these two metals, obtained by reduction in a very fine state of subdivision, after separating them in the usual manner from the slag formed, containing alkali earth metal oxides, alumina, silica and the like, by applying a powerful centrifugal action which causes the Ta to move apart from the columbium. Very reliable separation can thus be obtained. The part of the mixed metals, which fails to show a satisfactory separation, is repeatedly submitted to the centrifugal action. It is obvious that in the first place the concentrates at the very start must be brought to the required degree of fineness. It should be said that although the specific gravities of the two pentoxides (Ta₂O₅; D, 8.74 and Cb₂O₅; D, 4.47, that is to say a ratio of 1.95:1), are very different, their separation as such gives an inferior result compared with the separation of the metals.

(3) In the above description as to how the various ways to reduce the concentrates (from which impurities are preferably removed before the final reduction) may be carried out, it has been seen that two types of operations are possible: (a) batch operations, as in refractory crucibles, as used in the Goldschmidt process, or in any crucible steel furnace, or (b) a continuous operation, e. g. in such a furnace as the Gardner arc-resistance furnace for high temperatures (see U. S. Patents No. Re. 22,274 and No. 2,353,614); adapted for the distilling off of columbium (B. P. 3700°), if so desired.

It is important to mention also another advantage of continuous operation, quite apart from economy in calories, namely: it is possible to work in a suitable gaseous atmosphere, by passing through the system an inert gas, such as argon, helium, or the like; or by passing hydrogen, or natural gas; or, if desired, by working in vacuo. The application of high temperature has proved also very favorable for the decomposition of the two silicides formed, whereby the columbium silicide decomposes at just above 2600° and the tantalum silicide at over 3300°. As pure columbium melts first, at 1950°, its removal becomes a simple matter and can be carried out continuously.

Operations may be further simplified with advantage if the reduction of the pure oxides of tantalum and columbium is effected by the hydride method, with or without the addition of further reducing agents such as powdered light metals; and, if carried out in a continuous manner, in the presence of an inert gas, or in an atmosphere of hydrogen, hydrocarbons, such as in natural gas, carbon dioxide, or even in vacuo. In the case of the hydrides, the passage of carbon dioxide proves to be very useful, since at atmospheric pressure (according to W. Nernst and von Wartenberg, Zeitschr. f. physikal, Chemie 1906, vol. 56, p. 548) at 1600°, only 0.1% is decomposed; and even at 2500°, only 15.8% of the carbon dioxide is broken up. At a pressure lower than atmospheric, the dissociation is obviously greater, owing to the increase in volume.

At the temperature worked at, and in absence of rapid cooling, there is no danger that the reaction:

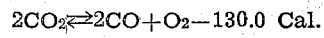

$$2CO_2 \rightleftarrows 2CO + O_2 - 130.0 \text{ Cal.}$$

which is endothermic if it goes from left to right, can take place. At the lower temperature, no danger of formation of carbide of tantalum (TaC) or of columbium (CbC), is to be feared, especially in view of the discharge of atomic hydrogen, when the hydrides are used, of which calcium hydride, with its breaking up temperature beyond 675°, has been found the most suitable, although lithium hydride and barium hydride can also be applied.

An important point is that the solubility of hydrogen in tantalum at 1850° is zero; and is zero at a still lower temperature in the case of columbium, which even has the tendency to ignite, if precautionary measures, as the choice of a suitable gaseous medium, are not taken up. It is obvious, that also high frequency furnaces, adapted specially for the present purpose, can be used, taking advantage of modern electronic heating, or any other suitable type of furnace. A type of modern heating advantageous for this invention is electrical induction heating, especially when the heated mixture contains powdery Al, Mg or Ca, these combined factors per se improving the process and its efficiency, even apart from the inclusion of the CaH₂ or equivalent agent mentioned.

A method, with several variations, has thus been disclosed, adapted to reduce the columbium and tantalum oxides, from which, in the concentrate form, are first preferably freed of all impurities contained in the tantalum-columbium minerals, with such reducing agents, as hydrides, silicides, borides, with or without powdered light metals, whereby the operations can be carried out in batch form in suitable refractory crucibles, or as a continuous operation in high temperature furnaces; in the latter case it is recommendable to carry out the process in a current of an inert gas, such as helium, argon, neon and the like, or pass a current of hydrogen, natural gas, carbon dioxide or the like, or even working under reduced pressure or in vacuo.

It is obvious that the more costly gases can be recovered and reused.

The presence in the mineral of a fluoride in no manner impedes the refining or reduction; on the contrary, the presence of a small proportion of a fluoride is favorable. Hydrated minerals undergo the same treatment.

It has furthermore been found advisable to dissolve out preliminarily the columbium pentoxide in anhydrous sodium tetraborate which latter, if the operation temperature is not pushed too high, remains indifferent to the tantalum pentoxide, thus separating the two compounds by the differential action of this vehicle. The most suitable temperature was found to be about or under 800°, to achieve the above results.

An important point empirically established is, that if the reduced metal is of suitable fineness, of a few hundred mesh, then the tantalum can be separated from columbium, in dry or wet state, by applying centrifugal power. The purity of the refined metals may be of the order of 99.998%, as an average; but even a 100% purity may be expected under special conditions; so any after refining is unnecessary.

It can be stated with certainty, that tantalum of the purity obtained, and this is correct for columbium as well, can be used to advantage in every industry wherein these metals have found a suitable practical application.

What is claimed is:

1. In a process for producing a metal of the metal group consisting of tantalum, columbium and mixtures thereof, from ore concentrate materials containing the same, the process stage comprising the treatment of the pentoxide of said group metal by reacting the same at an elevated reaction temperature in powdery form in admixture with a powdery converting agent selected from the group consisting of Al silicide, Ca silicide, Mg silicide, Li silicide and Ba silicide, together with an addition of an agent selected from the group consisting of Ca hydride, Li hydride and Ba hydride; the mixture being heated to a temperature whereat the converting agent dissociates, releasing its non-metal constituent to combine chemically with the group metal of the pentoxide; whereby after isolating such chemical compound so formed it may readily be reduced to the metal of said first mentioned group in a highly pure state.

2. In a process for producing a metal of the metal group consisting of tantalum, columbium and mixtures thereof, from ore concentrate material containing the same, the process stage comprising the treatment of the pentoxide of said group metal by reacting the same at an elevated temperature in powdery form in admixture with a powdery converting agent selected from the group consisting of lithium silicide, magnesium silicide, calcium silicide, barium silicide and aluminum silicide, along with a portion of a saline hydride agent selected from the group consisting of Ca hydride, Li hydride and Ba hydride acting to lower the reduction temperature, the mixture being heated to a temperature whereat the converting agent dissociates, releasing its non-metal constituent to combine chemically with the metal of the pentoxide to yield the silicide of said metal as a conversion product adapted to be thermally reduced to the pure metal by distilling away its non-metal constituent.

3. In a process for producing a metal of the metal group consisting of tantalum, columbium and mixtures thereof, from ore concentrate material containing the same, the process stage comprising the treatment of the pentoxide of said group metal by reacting the same at an elevated reaction temperature in powdery form in admixture with a powdery converting agent selected from the group consisting of the silicides of Al, Ca, Mg, Li and Ba, the mixture being heated to a temperature whereat the silicide agent dissociates, releasing its silicon constituent to combine chemically with the group metal of the pentoxide to yield a conversion product, adapted in a second stage, after isolating such conversion product, to be reduced to the metal of said first mentioned group in a highly pure state.

4. In a process for producing a metal of the metal group consisting of tantalum, columbium and mixtures thereof, from ore concetrate materials containing the same, the process stage comprising the treatment of the pentoxide of said group metal by heating the same at an elevated temperature in powdery form in admixture with a powdery converting agent selected from the group consisting of the silicides of Li, Mg, Ca, Ba and Al; the mixture being heated to a temperature whereat the converting silicide agent breaks down and dissociates and thereby releases its silicon constituent in highly reactive atomic form promptly to combine chemically with the group metal of the pentoxide, to yield the silicide of said metal as a conversion product adapted to reduction to the said metal by chemical dissociation under further elevated temperature.

5. The process as in claim 4, wherein the converting agent is calcium silicide and the reaction temperature is about 1000° C.; and wherein after the said converting reaction the silicide of the metal of the first mentioned group is isolated and thereupon may readily be heated further to about 1120° C. to dissociate the last mentioned silicide and yield said metal.

6. A process for producing the silicide of a metal of the group consisting of Ta and Cb and mixtures thereof from starting materials containing the pentoxide of a metal of said group comprising the treatment of such pentoxide by reacting the same in powdery form in admixture with a powdery converting agent selected from the group consisting of lithium silicide, magnesium silicide, calcium silicide, barium silicide and aluminum silicide, at an elevated temperature, such that the converting agent breaks down and thereby releases its silicon constituent in a highly reactive form promptly to combine chemically with the group metal constituent of the pentoxide and thereby to yield the silicide of said metal constituent as a conversion compound.

7. The process according to claim 6 for producing both Ta and Cb from a mixture of their pentoxides, characterized in that before reduction the mixed metal pentoxides are separated from each other by differential precipitation, namely, by dispersing such mixture in powdery form in a bath of molten $Na_2B_4O_7$ maintained at about 800° C. and allowing the Ta pentoxide to precipitate while the Cb pentoxide remains dispersed in the hot bath; and separately removing the portions containing the Ta and Cb pentoxides respectively.

8. In a process for producing a metal of the metal group consisting of tantalum, columbium and mixtures thereof, from ore concentrate materials containing the oxide of said group metal, the treatment of such metal oxide by reacting the same at an elevated reaction temperature in powdery form in admixture with a powdery converting agent selected from the group consisting of lithium silicide and magnesium silicide and calcium silicide and barium silicide and aluminum silicide, to which is added a small amount of a saline hydride, and a powdery reducing agent selected from the group consisting of the light metals magnesium, calcium and aluminum; the mixture being heated to a temperature whereat the light metal reducing agent ignites and combines exothermically with part of the oxygen present, thereby yielding by reduction the metal of the first mentioned group.

9. In a process including the stage of treating a pentoxide of a metal of the metal group consisting of tantalum, columbium and mixtures thereof, to produce the silicide of such group metal, the step comprising reacting said pentoxide at an elevated reaction temperature in powdery form in admixture with a powdery converting agent selected from the group consisting of aluminum silicide, calcium silicide, magnesium silicide, lithium silicide and barium silicide, to which silicide has been added some calcium hydride affording an enhanced calorific effect; the mixture being heated to a temperature whereat the silicide converting agent dissociates and releases its silicon constituent to combine with the group metal constituent of the pentoxide.

10. The process as in claim 9 and wherein the silicide agent is $Al_4Si_3$ and the resulting equation yields the silicide of the selected group metal and calcium aluminate and hydrated silico-aluminate.

DANIEL GARDNER.

REFERENCES CITED

The following references are of record in the file of this patent:

UNITED STATES PATENTS

| Number | Name | Date |
|---|---|---|
| 866,385 | von Pirani | Sept. 17, 1907 |
| 1,415,516 | Bridge | May 9, 1922 |
| 2,140,800 | Leemans | Dec. 20, 1938 |
| 2,183,517 | Leemans | Dec. 12, 1939 |
| 2,205,386 | Balke et al. | June 25, 1940 |
| 2,411,524 | Davis | Nov. 26, 1946 |
| 2,427,338 | Alexander | Sept. 16, 1947 |
| 2,427,339 | Alexander | Sept. 16, 1947 |

FOREIGN PATENTS

| Number | Country | Date |
|---|---|---|
| 483,406 | Great Britain | Apr. 30, 1938 |

OTHER REFERENCES

Meerson et al., "Reduction of Oxides of Metals of High Melting Points With Calcium Hydride," Chemical Abstracts, vol. 35, 1941, col. 4712 (1).

Paneth, "Radio-Elements As Indicators," published in 1928, by McGraw-Hill Book Co., Inc., N. Y., p. 117.

Pietsch et al., "Formation of Metal Hydrides with Atomic Hydrogen," Chem. Abstracts, vol. 28, 1934, col. 6647 (8).